No. 863,563.
PATENTED AUG. 13, 1907.
T. H. WALTHER.
RECREATION VEHICLE.
APPLICATION FILED DEC. 19, 1906.
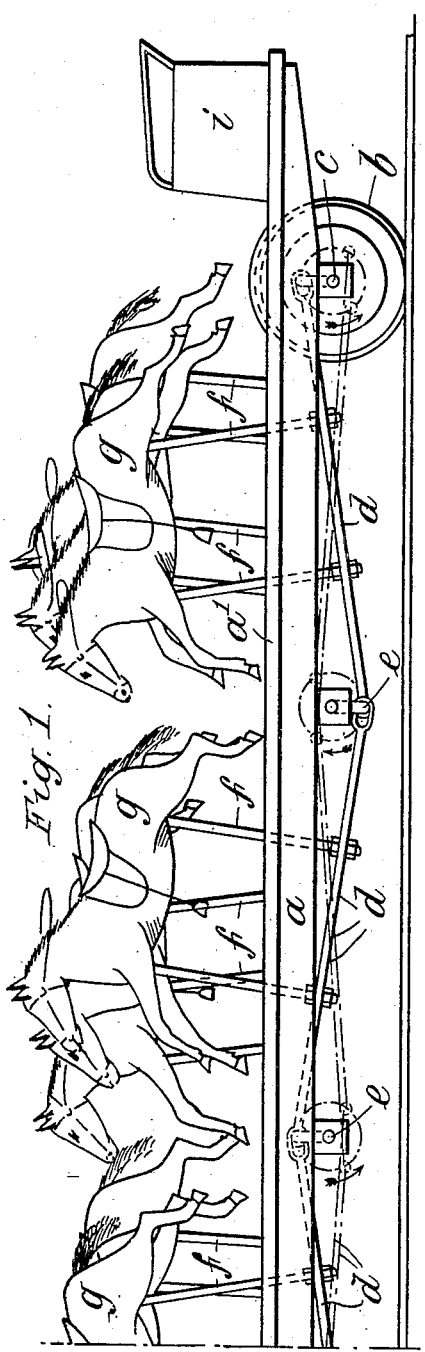
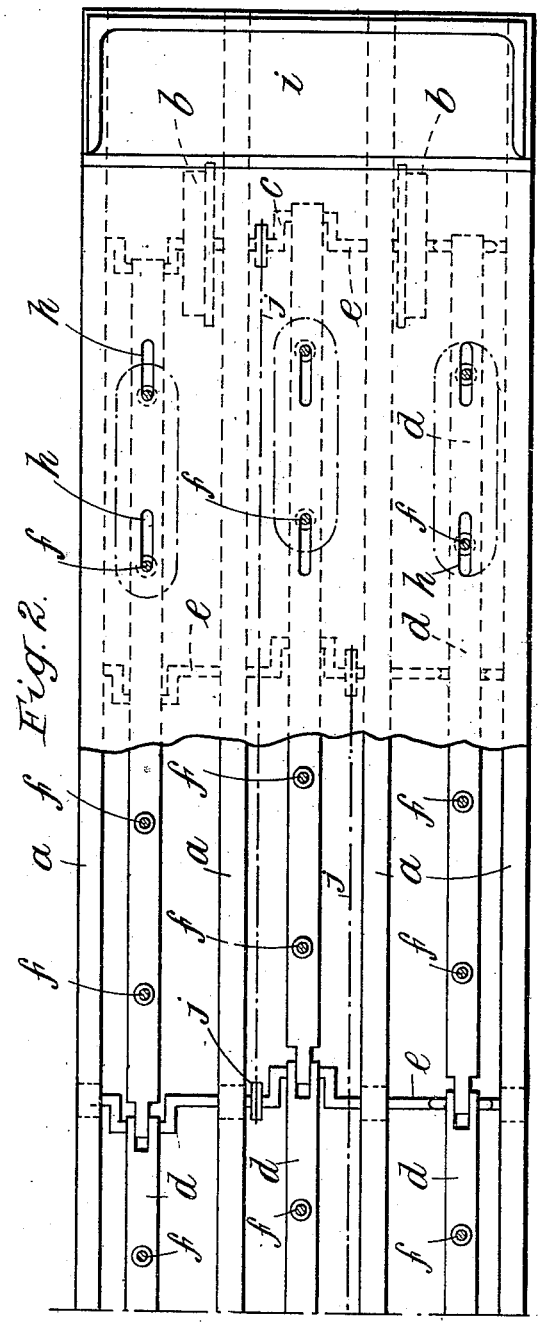
Witnesses
Frederick Cleveland
Ernest Keable
Inventor
Thomas Henry Walther
by Wheatley Mackenzie
Attorneys.

UNITED STATES PATENT OFFICE.

THOMAS HENRY WALTHER, OF MANGATAINOKA, NEW ZEALAND, ASSIGNOR TO THOMAS WILLIAM POTTS, OF FULHAM, ENGLAND.

RECREATION-VEHICLE.

No. 863,563.  Specification of Letters Patent.  Patented Aug. 13, 1907.

Application filed December 19, 1906. Serial No. 348,601.

*To all whom it may concern:*

Be it known that THOMAS HENRY WALTHER, a subject of the King of Great Britain and Ireland, whose residence is Mangatainoka, New Zealand, has invented certain new and useful Improvements in Recreation-Vehicles; and he does hereby declare the following to be a full, clear, and exact description of the invention, such as will enable others skilled in the art to which it appertains to make and use the same.

This invention for an improvement in switchback or other railways for recreation or amusement, roundabouts, rocking horses and similar mechanical devices, consists in connecting seats, horses or the like to the traveling wheels of vehicles used in switchback or other recreation railways or tracks, roundabouts, stationary or moving rocking or other mechanical horses, by means of coupled crank axles in such a manner that a rising and falling motion is imparted to the seat, horse, or the like, which is mounted on the crank axles as the vehicle is propelled, or the movement of the vehicle may be assisted by the exertions of the riders or passengers.

In one way of carrying out this invention, a suitable framing is mounted on four wheels connected in pairs by crank axles adapted to rotate with the wheels, and supporting a movable platform or support on which a horse or carriage body is fixed.

In a modified form of construction each axle may be provided with two cranks at an angle of 180° and supporting two platforms rising alternately. When the traveling wheels rotate the platforms carrying horses or seating arrangements for passengers are raised and lowered and moved backwards and forwards, the motion having a pleasant and exhilarating effect on the passengers or riders.

The vehicles to which this invention is applied may be propelled by gravity or power, or the passenger may effect or assist in the propulsion by judiciously bringing his weight to bear more directly over the cranks as they descend. When applied to rocking horses, the horse is mounted on a platform or directly on the crank axles which are fixed in wheels and moved by the exertions of the rider.

In the accompanying sheet of illustrative drawings Figure 1 is a side elevation of a carriage constructed according to this invention for use on recreation railways, and Fig. 2 is a plan partly in section.

The framing $a$ on which a platform or foot-board $a'$ is fixed, is mounted on wheels $b$ connected in pairs by the crank axles $c$ which are adapted to rotate with the wheels. Intermediate crank shafts $e$ are journaled in suitable brackets in the framing $a$ between each row of horses. Movable platforms or supports $d$ are mounted on the cranks and couple together the crank axles $c$ and crank shafts $e$. To the supports $d$ are bolted or otherwise secured the lower ends of uprights or supporting rods or bars $f$ which pass through slots $h$ in the foot-board $a'$ and serve to support horses $g$, birds, cars, or other devices at their upper ends. As shown, the horses $g$ are arranged three in a row and the cranks at an angle of 120° with each other. The cranks at opposite ends of each support $d$ are so arranged relatively that when the front of the support $d$ is in its highest position the rear end of the support is in its lowest position and vice versa. The shafts are preferably all connected by chain and sprocket gear as shown at $j$ to insure the steady and smooth running of all the shafts. If desired, the moving supports for the central or any other line of horses may be mounted on cranks in such manner that the horses will always remain horizontal although reciprocating with the platform or support.

An electric or other motor is mounted on the front or back of the frame of the carriage in a drivers box or seat $i$ under which an electric accumulator may be placed for supplying current to light the horses at nighttime preferably by means of electric incandescent lamps placed in the horses eyes.

I claim as my invention—

1. A vehicle for recreation, comprising a series of track wheels, a framing, crank axles mounted to rotate in the framing and fixed to opposite pairs of wheels to rotate therewith, intermediate crank shafts mounted in the framing between the crank axles, movable platforms or supports mounted on the cranks and adapted to couple together the crank axles and crank shafts, and seats on the supports.

2. A vehicle for recreation, comprising a series of track wheels, a framing, crank axles mounted to rotate in the framing and fixed to opposite pairs of wheels to rotate therewith, intermediate crank shafts mounted in the framing between the crank axles, sprocket gear operatively connecting the various crank shafts with each other, movable platforms or supports mounted on the cranks and adapted to couple together the crank axles and crank shafts, and seats on the supports.

3. A vehicle for recreation, comprising a series of track wheels, a framing, crank axles mounted to rotate in the framing and fixed to opposite pairs of wheels to rotate therewith, intermediate crank shafts mounted in the framing between the crank axles, movable platforms or supports mounted on the cranks and adapted to couple together the crank axles and crank shafts, seats on the supports, a fixed platform or footboard on the framing above the cranks provided with slots or openings, rods fixed at their lower ends in the movable platforms or supports between the cranks and passing upwards through the slots in the footboard, and horses, birds, cars, or other devices fixed on the upper ends of the rods.

4. A vehicle for recreation, comprising a series of track wheels, a framing, crank axles mounted to rotate in the framing and fixed to opposite pairs of wheels to rotate therewith, intermediate crank shafts mounted in the framing between the crank axles, movable platforms or supports mounted on the cranks and adapted to couple together the crank axles and crank shafts, seats on the supports, a fixed platform or footboard on the framing above the cranks provided with slots or openings, rods fixed at their lower ends in the movable platforms or supports between the cranks and passing upwards through the slots in the footboard, horses fixed on the upper ends of the rods, and means for illuminating the horses, substantially as described.

In testimony whereof he has affixed his signature, in presence of two witnesses.

THOMAS HENRY WALTHER.

Witnesses:
BERTTON SOUTH,
ALLAN MACFARLANE.